(12) United States Patent
Takata et al.

(10) Patent No.: US 12,463,721 B2
(45) Date of Patent: Nov. 4, 2025

(54) COMMUNICATION CONTROL SYSTEM, COMMUNICATION CONTROL APPARATUS, AND COMMUNICATION CONTROL METHOD

(71) Applicant: NEC Corporation, Tokyo (JP)

(72) Inventors: Koya Takata, Tokyo (JP); Atsushi Kamoi, Tokyo (JP); Hisashi Mizumoto, Tokyo (JP); Masaki Aizono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 308 days.

(21) Appl. No.: 18/222,782

(22) Filed: Jul. 17, 2023

(65) Prior Publication Data

US 2024/0097786 A1 Mar. 21, 2024

(30) Foreign Application Priority Data

Sep. 20, 2022 (JP) .............................. JP2022-149249

(51) Int. Cl.
| | | |
|---|---|---|
| H04B 10/11 | (2013.01) | |
| H04B 10/03 | (2013.01) | |
| H04B 10/032 | (2013.01) | |
| H04B 10/038 | (2013.01) | |
| H04B 10/112 | (2013.01) | |

(52) U.S. Cl.
CPC ............ *H04B 10/11* (2013.01); *H04B 10/03* (2013.01); *H04B 10/032* (2013.01); *H04B 10/038* (2013.01); *H04B 10/1129* (2013.01)

(58) Field of Classification Search
CPC .... H04B 10/03; H04B 10/032; H04B 10/038; H04B 10/11–116; H04B 10/1129

USPC .................................. 398/1–2, 5–6, 118–131
See application file for complete search history.

(56) References Cited

U.S. PATENT DOCUMENTS

| | | | |
|---|---|---|---|
| 6,928,248 B2* | 8/2005 | Achour ................ | H04B 10/032 |
| | | | 398/115 |
| 2013/0129341 A1* | 5/2013 | D'Errico ............ | H04B 10/1123 |
| | | | 398/5 |
| 2020/0065141 A1* | 2/2020 | Pai ...................... | G06F 9/45558 |

FOREIGN PATENT DOCUMENTS

| | | | |
|---|---|---|---|
| JP | S62103340 U | * | 7/1987 |
| JP | 2013-243631 A | | 12/2013 |
| JP | 2021-535698 A | | 12/2021 |

* cited by examiner

*Primary Examiner* — Li Liu
(74) *Attorney, Agent, or Firm* — Sughrue Mion, PLLC

(57) ABSTRACT

A communication control system includes at least one processor executing: a main communication process of carrying out communication with one or more targets through an optical fiber line; a specifying process of specifying, from among the one or more targets, a free-space optical communication target based on communication statuses in the main communication process; a sub communication process of carrying out communication with the free-space optical communication target via a free-space optical communication apparatus(es); and a selecting process of selecting, according to at least one of (i) a capacity of the communication with the free-space optical communication target in the main communication process, (ii) the communication statuses of the free-space optical communication apparatuses, and (iii) processing capacities of the free-space optical communication apparatuses, a path for free-space optical communication with the free-space optical communication target in the sub communication process.

15 Claims, 8 Drawing Sheets

COMMUNICATION CONTROL SYSTEM, COMMUNICATION CONTROL APPARATUS, AND COMMUNICATION CONTROL METHOD

This Nonprovisional application claims priority under 35 U.S.C. § 119 on Patent Application No. 2022-149249 filed in Japan on Sep. 20, 2022, the entire contents of which are hereby incorporated by reference.

TECHNICAL FIELD

The present invention relates to a communication control system, a communication control apparatus, and a communication control method.

BACKGROUND ART

A communication system using an optical fiber requires, if an abnormality occurs in the optical fiber, a line that carries out backup of the optical fiber line.

Patent Literature 1 discloses a redundant communication system including: a master station apparatus for optical communication; and a plurality of slave station apparatuses connected to the master station apparatus, the plurality of slave station apparatuses being respectively connected, in a one-to-one relation, to free-space optical transmitters/receivers which communicate with each other through free-space optical communication. According to the redundant communication system, if a failure occurs in a transmission path between the master station apparatus and one of the slave station apparatuses, communication is carried out with another one of the slave station apparatuses close to the one of the slave station apparatuses via free-space optical transmitters/receivers.

CITATION LIST

Patent Literature

[Patent Literature 1]
Japanese Patent Application Publication, Tokukai, No. 2013-243631

SUMMARY OF INVENTION

Technical Problem

However, according to the technique disclosed in Patent Literature 1, backup of optical communication of a certain slave station apparatus is carried out with use of (i) a free-space optical transmitter/receiver connected to the certain slave station apparatus and (ii) a free-space optical transmitter/receiver connected to another slave station apparatus close to the certain slave station apparatus. Thus, a path passing through the another slave station apparatus close to the certain slave station apparatus is fixedly used as a backup path. If it is possible to suitably select a path for free-space optical communication which path carries out backup of optical fiber communication, this would be useful.

An example object of the present invention is to provide a communication control system, a communication control apparatus, and a communication control method each of which is capable of suitably selecting a path for free-space optical communication which path carries out backup of optical fiber communication.

Solution to Problem

An example aspect of a communication control system of the present invention includes at least one processor, the at least one processor executing: a main communication process of carrying out communication with one or more targets through an optical fiber line; a specifying process of specifying, from among the one or more targets, a free-space optical communication target on a basis of communication statuses in the main communication process; a sub communication process of carrying out communication with the free-space optical communication target through at least one of free-space optical communication apparatuses; an obtaining process of obtaining at least one of (i) a capacity of the communication with the free-space optical communication target in the main communication process, (ii) communication statuses of the free-space optical communication apparatuses, and (iii) processing capacities of the free-space optical communication apparatuses; and a selecting process of selecting, in accordance with at least one of (i) the capacity of the communication, (ii) the communication statuses, and (iii) the processing capacities thus obtained, a path for free-space optical communication with the free-space optical communication target which is to be carried out in the sub communication process.

An example aspect of a communication control apparatus of the present invention includes at least one processor, the at least one processor executing: a main communication process of carrying out communication with one or more targets through an optical fiber line; a specifying process of specifying, from among the one or more targets, a free-space optical communication target on a basis of communication statuses in the main communication process; a sub communication process of carrying out communication with the free-space optical communication target through at least one of free-space optical communication apparatuses; an obtaining process of obtaining at least one of (i) a capacity of the communication with the free-space optical communication target in the main communication process, (ii) communication statuses of the free-space optical communication apparatuses, and (iii) processing capacities of the free-space optical communication apparatuses; and a selecting process of selecting, in accordance with at least one of (i) the capacity of the communication, (ii) the communication statuses, and (iii) the processing capacities thus obtained, a path for free-space optical communication with the free-space optical communication target which is to be carried out in the sub communication process.

An example aspect of a communication control method of the present invention includes: (a) carrying out communication with one or more targets through an optical fiber line; (b) specifying, from among the one or more targets, a free-space optical communication target on a basis of communication statuses in (a); (c) carrying out communication with the free-space optical communication target through at least one of free-space optical communication apparatuses; (d) obtaining at least one of (i) a capacity of the communication with the free-space optical communication target in (a), (ii) communication statuses of the free-space optical communication apparatuses, and (iii) processing capacities of the free-space optical communication apparatuses; and (e) selecting, in accordance with at least one of (i) the capacity of the communication, (ii) the communication statuses, and (iii) the processing capacities thus obtained, a path for free-space optical communication with the free-space optical communication target in (c).

Advantageous Effects of Invention

It is possible to suitably select a path for free-space optical communication which path carries out backup of optical fiber communication.

DESCRIPTION OF EMBODIMENTS

First Example Embodiment (Communication Control System)

The following description will discuss a communication control system 100 in accordance with a first example embodiment of the present invention with reference to the drawings. The communication control system 100 is a system for controlling optical fiber communication and free-space optical communication. The optical fiber communication refers to communication involving use of light propagating through an optical fiber. The free-space optical communication refers to communication involving use of light propagating in a space. Examples of the light used in the optical fiber communication and the free-space optical communication can include a millimeter wave, a sub-millimeter wave, infrared light, visible light, and ultraviolet light.

Figure 1:
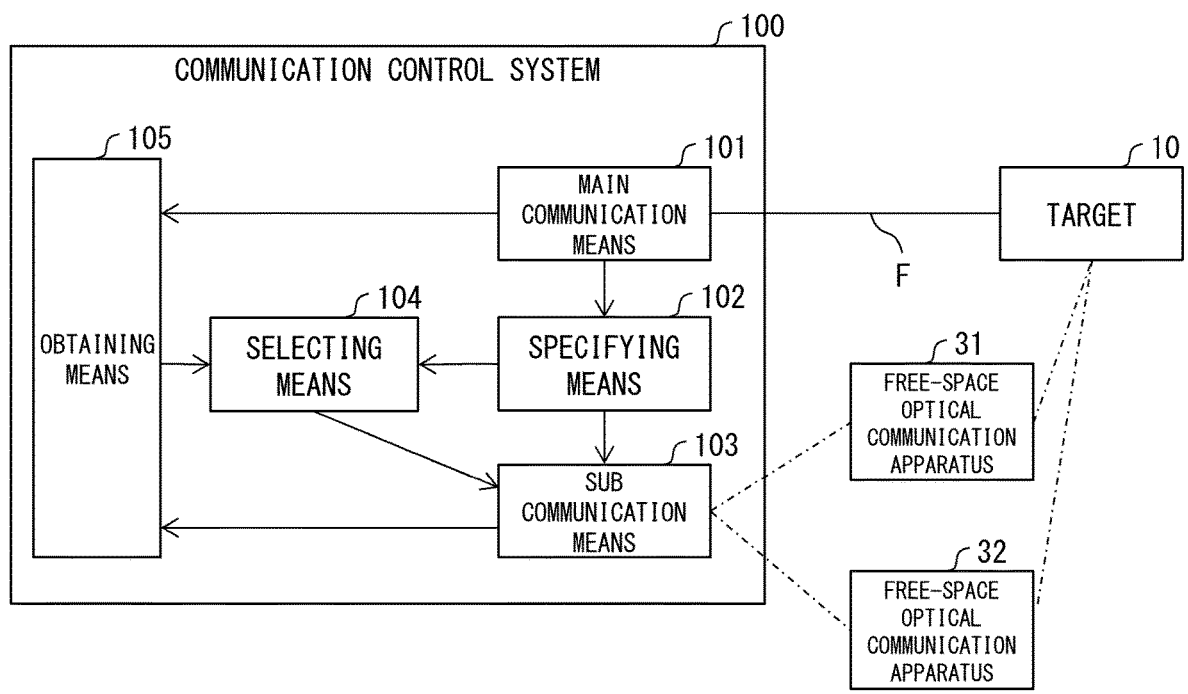
FIG. 1 is a block diagram illustrating an example of a configuration of a communication control system in accordance with a first example embodiment.

FIG. 1 is a functional block diagram illustrating an example of a configuration of the communication control system 100 in accordance with the first example embodiment of the present invention. In FIG. 1, each block indicates a configuration in units of function. Thus, the blocks in FIG. 1 may be implemented in a single apparatus or a plurality of apparatuses. Alternatively, some of or all of the blocks may be implemented as functions in, e.g., a cloud. The communication control system 100 includes a main communication means 101, a specifying means 102, a sub communication means 103, a selecting means 104, and an obtaining means 105.

The main communication means 101 communicates with one or more targets 10 through an optical fiber line F. The target 10 may be, for example, (i) an optical network unit (ONU) connected with a free-space optical communication apparatus through a radio line, a wired line, an optical fiber line, or the like, (ii) a free-space optical communication apparatus connected to the ONU through a radio line, a wired line, an optical fiber line, or the like, (iii) a communication apparatus having functions of both the ONU and the free-space optical communication apparatus, or (iv) a communication apparatus connected to both the ONU and the free-space optical communication apparatus.

The specifying means 102 specifies, from among the one or more targets 10, a free-space optical communication target on the basis of a communication status of the main communication means 101. The communication status of the main communication means 101 may be a state in which an abnormality occurs in communication of the main communication means 101 with a certain target 10, examples of which include a state in which at least part of a path of the communication of the main communication means 101 with the certain target 10 is interrupted, a state in which at least part of the path of the communication of the main communication means 101 with the certain target 10 is a maintenance target, and a state in which at least part of the path of the communication of the main communication means 101 with the certain target 10 is overloaded. On the basis of such a communication status, the specifying means 102 specifies the certain target 10 as the free-space optical communication target.

The obtaining means 105 obtains at least one of (i) a capacity of the communication of the main communication means 101 with the free-space optical communication target (e.g., the target 10), (ii) communication statuses of the free-space optical communication apparatuses, and (iii) processing capacities of the free-space optical communication apparatuses.

The obtaining means 105 may obtain, from the main communication means 101, the capacity of the communication of the main communication means 101 with the free-space optical communication target, and may store the communication capacity therein.

Further, the obtaining means 105 may obtain, from the sub communication means 103, the communication statuses of the free-space optical communication apparatuses. Examples of the communication statuses of the free-space optical communication apparatuses include the number of clear channels, the number of channels in use, a communication rate, a communication quality, the presence or absence of a failure, and an available communication capacity of the free-space optical communication apparatuses.

Further, the obtaining means 105 may collect the processing capacities of the free-space optical communication apparatuses via the sub communication means 103. Alternatively, the processing capacities of the free-space optical communication apparatuses may be input to the communication control system 100 in advance. Examples of the processing capacities encompass information indicating a computing capacity, a total number of channels, whether wavelength multiplexing can be carried out, a transmission capacity, and a communication rate. However, this is not limitative. Note that the obtaining means 105 may collect the transmission capacity, the communication rate, and/or the like at the time of transmission and at the time of reception.

The selecting means 104 selects, in accordance with at least one of (i) the capacity of the communication of the main communication means 101 with the free-space optical communication target (e.g., the target 10), (ii) the communication statuses of the free-space optical communication apparatuses, and (iii) the processing capacities of the free-space optical communication apparatuses obtained by the obtaining means 105, a path for free-space optical communication of the sub communication means 103 with the free-space optical communication target (e.g., the target 10). For example, in the example shown in FIG. 1, the selecting means 104 selects the path for free-space optical communication with the target 10 out of (i) a path passing through the free-space optical communication apparatus 31 and (ii) a path passing through the free-space optical communication apparatus 32.

Note that the capacity of the communication of the main communication means 101 with the free-space optical communication target, obtained by the obtaining means 105, can be rephrased as a capacity of communication carried out in the past by the main communication means 101 with the free-space optical communication target (e.g., the target 10).

For example, on the basis of the obtained capacity of the communication of the main communication means 101 with the free-space optical communication target, the selecting means 104 may estimate a communication capacity necessary to carry out communication between the sub communication means 103 and the free-space optical communication target, and may select a path for free-space optical communication in such a manner as to satisfy the necessary communication capacity thus estimated.

For another example, in accordance with the obtained communication statuses of the free-space optical communication apparatuses, the selecting means 104 may select a path for free-space optical communication which path satisfies a given standard. For example, in a case where each of the free-space optical communication apparatuses has communication paths of a plurality of channels, the selecting means 104 can estimate, on the basis of the number of clear channels of each of the free-space optical communication apparatuses, a communication capacity that the free-space optical communication apparatus can carry out communication. Consequently, the selecting means 104 can select a path for free-space optical communication which path has a communication capacity satisfying the standard.

For another example, in accordance with the obtained processing capacities of the free-space optical communication apparatuses, the selecting means 104 may select a path for free-space optical communication which path satisfies a given standard. In accordance with the processing capacities of the free-space optical communication apparatuses, the selecting means 104 can select a path for free-space optical communication which path has a processing capacity satisfying the standard.

Further, the selecting means 104 may select a path for free-space optical communication in accordance with a combination of the above-described standards or in accordance with another standard.

In accordance with the path selected by the selecting means 104, the sub communication means 103 communicates, via a free-space optical communication apparatus (31 or 32), with the free-space optical communication apparatus specified by the specifying means 102 (e.g., the target 10). Note that a communication method of the communication between the sub communication means 103 and the free-space optical communication apparatus 31 may be free-space optical communication. There is no particular limitation on the communication method of the communication between the free-space optical communication apparatus 31 and the free-space optical communication target (e.g., the target 10). The free-space optical communication apparatus 31 and the free-space optical communication target may communicate with each other via radio communication, such as near-field radio communication, or wired communication.

In an example, the communication control system 100 may be a housing station of the optical fiber line or a free-space optical communication apparatus.

(Communication Control Method)

Figure 2:
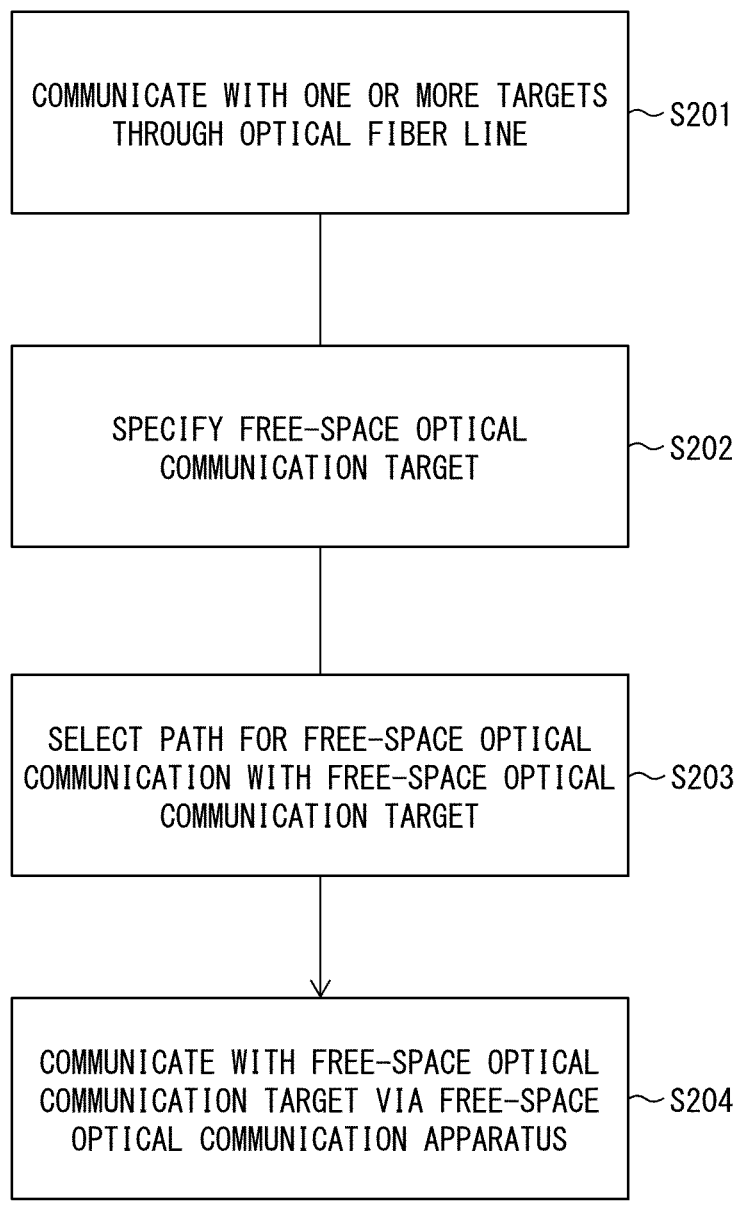
FIG. 2 is a flowchart illustrating an example of operation of the communication control system in accordance with the first example embodiment.

The following description will discuss, with reference to the drawings, operation (communication control method) of the communication control system in accordance with the first example embodiment. FIG. 2 is a flowchart illustrating an example of operation of the communication control system 100.

Prior to step S201, the obtaining means 105 executes, in advance, the step of obtaining at least one of (i) a capacity of communication between the main communication means 101 and a free-space optical communication target, (ii) communication statuses of the free-space optical communication apparatuses, and (iii) processing capacities of the free-space optical communication apparatuses. Note that this step may be executed in parallel with the later-described steps S201 to S203.

Then, in step S201, the main communication means 101 communicates with one or more targets 10 through the optical fiber line F.

In step S202, the specifying means 102 specifies, from among the one or more targets 10, a free-space optical communication target on the basis of the communication statuses obtained in step S201.

In step S203, the selecting means 104 selects, in accordance with at least one of (i) a capacity of communication of the main communication means 101 with the free-space optical communication target (e.g., the target 10), (ii) the communication statuses of the free-space optical communication apparatuses, and (iii) the processing capacities of the free-space optical communication apparatuses obtained by the obtaining means 105, a path for free-space optical communication of the sub communication means 103 with the free-space optical communication target (e.g., the target 10).

In step S204, in accordance with the path selected in step S203, the sub communication means 103 communicates, via a free-space optical communication apparatus (31 or 32), with the free-space optical communication apparatus specified by the specifying means 102 (e.g., the target 10).

(Communication Control Apparatus)

Figure 3:
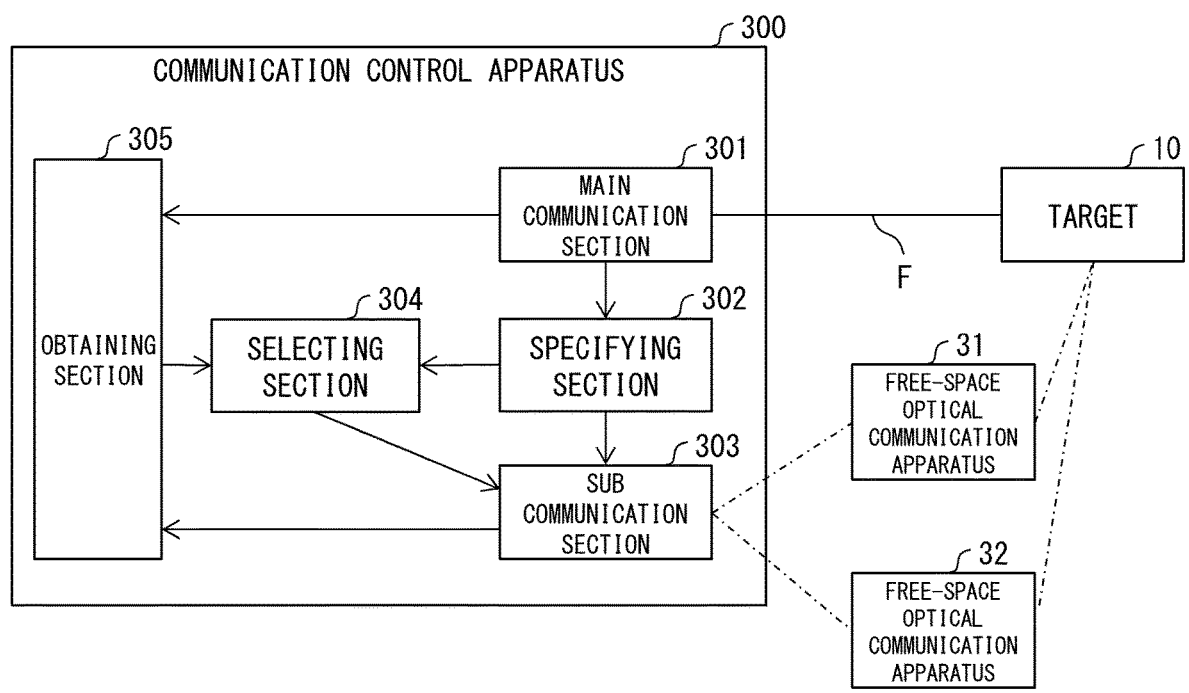
FIG. 3 is a block diagram illustrating an example of a configuration of a communication control apparatus in accordance with the first example embodiment.

FIG. 3 is a block diagram illustrating an example of a configuration of a communication control apparatus 300 in accordance with the first example embodiment of the present invention. A main communication section 301 has the same function as the main communication means 101, and communicates with one or more targets 10 through an optical fiber line F. A specifying section 302 has the same function as the specifying means 102, and specifies, from one or more targets 10, a free-space optical communication target on the basis of a communication status of the main communication section 301. A sub communication section 303 has the same function as the sub communication means 103, and communicates, via a free-space optical communication apparatus (31 or 32), with the free-space optical communication apparatus (e.g., the target 10) specified by the specifying section 302. A selecting section 304 has the same function as the selecting means 104, and selects, in accordance with at least one of (i) a capacity of communication of the main communication section 301 with the free-space optical communication target (e.g., the target 10), (ii) communication statuses of the free-space optical communication apparatuses, and (iii) the processing capacities of the free-space optical communication apparatuses obtained by the obtaining section 305, a path for free-space optical communication of the sub communication section 303 with the free-space optical communication target (e.g., the target 10). The obtaining section 305 has the same function as the obtaining means 105, and obtains at least one of (i) the capacity of the communication of the main communication section 301 with the free-space optical communication target (e.g., the target 10), (ii) the communication statuses of the free-space optical communication apparatuses, and (iii) the processing capacities of the free-space optical communication apparatuses. The specifying section 302, the selecting section 304, and the obtaining section 305 may be a computer apparatus including a processor executing a program stored in a memory to execute a process. The specifying section 302, the selecting section 304, and the obtaining section 305 may be included in the free-space optical communication apparatus 31 or 32.

For example, the specifying section 302 may be a single computer apparatus or a single server apparatus. Alternatively, the specifying section 302 may be a computer apparatus group including a plurality of computer apparatuses which operate in cooperation or a server apparatus group including a plurality of server apparatuses which operate in cooperation. At least one of the selecting section 304 and the obtaining section 305 may have the same configuration as the specifying section 302. With the communication control apparatus 300, it is possible to attain the same effect as that given by the communication control system 100.

In an example, the communication control apparatus 300 may be a housing station of the optical fiber line or a free-space optical communication apparatus.

Effects of the Present Example Embodiment

The communication control system, the communication control method, and the communication control apparatus in accordance with the first example embodiment are each capable of carrying out backup by selecting, from among a plurality of paths which can be constructed by free-space optical communication apparatuses, a suitable path as a path for free-space optical communication which path carries out the backup, the selecting being carried out in accordance with at least one of (i) a communication capacity of optical fiber communication that is a target of backup, (ii) communication statuses of free-space optical communication apparatuses for backup, and (iii) processing capacities of the free-space optical communication apparatuses. Thus, even in a case where an abnormality such as interruption, maintenance, or overload occurs in the optical fiber communication, it is possible to carry out suitable backup therefor.

Second Example Embodiment

A communication control system 400 in accordance with a second example embodiment differs from the communication control system 100 in accordance with the first example embodiment in that the communication control system 400 includes a specifying means 402 instead of the specifying means 102. The communication control system 400 further includes a storage means 410. Note that configurations identical to those of the first example embodiment are given identical reference signs, and a description thereof will be omitted.

Figure 4:
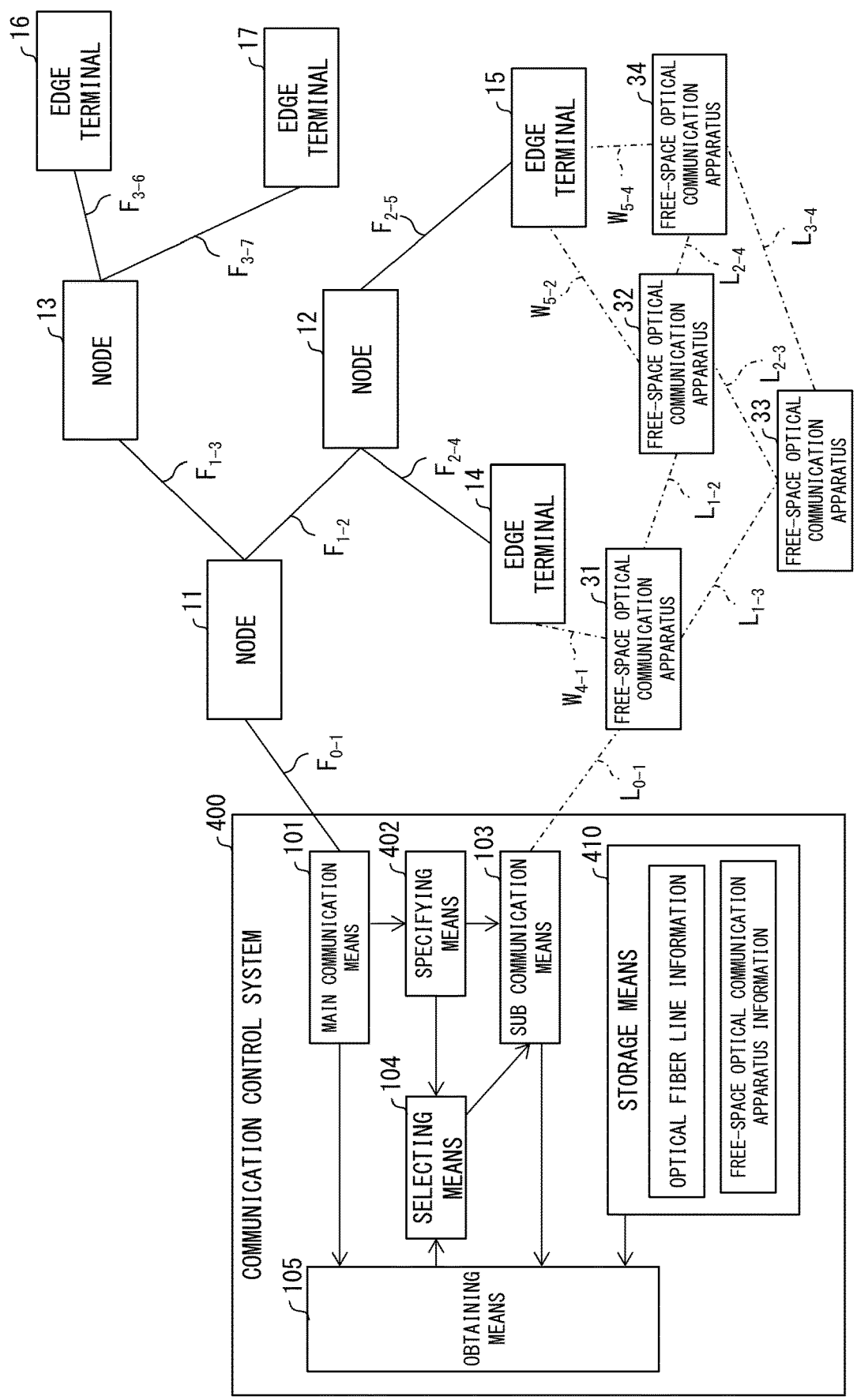
FIG. 4 is a block diagram illustrating an example of a configuration of a communication control system in accordance with a second example embodiment.

FIG. 4 is a block diagram illustrating an example of a configuration of the communication control system 400 in accordance with the second example embodiment of the present invention. As shown in FIG. 4, the communication control system 400 includes a main communication means 101, the specifying means 402, a sub communication means 103, a selecting means 104, an obtaining means 105, and the storage means 410.

The main communication means 101 communicates with edge terminals 14 to 17, which are communication targets, via optical fiber lines $F_{0-1}$, $F_{1-2}$, $F_{1-3}$, $F_{2-4}$, $F_{2-5}$, $F_{3-6}$, and $F_{3-7}$ each of which branches from a corresponding one of nodes 11 to 13.

The nodes 11 to 13 are devices each of which relays communication carried out through the optical fiber lines. The node may be a device that relays communication, such as an amplifier, or a device from which optical fiber lines branch. Note that there is no particular limitation on the number of branches at each node. The edge terminals 14 to 17 are targets of communication carried out via the optical fiber lines. Each of the edge terminals 14 to 17 may be, for example, (i) an optical network unit (ONU) connected with a free-space optical communication apparatus through a radio line, a wired line, an optical fiber line, or the like, (ii) a free-space optical communication apparatus connected to the ONU through a radio line, a wired line, an optical fiber line, or the like, (iii) a communication apparatus having functions of both the ONU and the free-space optical communication apparatus, or (iv) a communication apparatus connected to both the ONU and the free-space optical communication apparatus.

The sub communication means 103 communicates with a free-space optical communication target via at least part of the free-space optical communication apparatuses 31 to 34. Connection between the sub communication means 103 and the free-space optical communication apparatus 31, which is adjacent to the sub communication means 103, and connection between adjacent ones of the free-space optical communication apparatuses are made via optical paths $L_{0-1}$, $L_{1-2}$, $L_{1-3}$, $L_{2-3}$, $L_{2-4}$, and $L_{3-4}$ for free-space optical communication. Further, the free-space optical communication apparatuses and the edge terminals are communicable with each other via a given communication means. For example, the free-space optical communication apparatuses and the edge terminals are connected with each other through, e.g., near-field radio communications $W_{4-1}$, $W_{5-2}$, and $W_{5-4}$.

The storage means 410 may be, for example, a random access memory (RAM), a solid-state drive, or a hard disk drive. The storage means 410 stores therein optical fiber line information, free-space optical communication apparatus information. The optical fiber line information includes map information of the optical fiber lines, branching information of the optical fiber lines, maximum communication capacities of the optical fiber lines, communication capacity information of the optical fiber lines, and/or the like. The free-space optical communication apparatus information includes processing capacities of the free-space optical communication apparatuses, communication statuses of the free-space optical communication apparatuses, and/or the like.

The map information of the optical fiber line may be information indicating positions of the optical fiber lines (e.g., latitudes and longitudes of the optical fiber lines). Note that the map information of the optical fiber lines may include correspondence relations between the optical fiber lines and their adjacent free-space optical communication apparatuses. The branching information of the optical fiber lines is information indicating (i) connection relations (branching relations) between the optical fiber lines and (ii)

a range of an effect of a failure of any optical fiber line when the failure occurs. The maximum communication capacity information of the optical fiber lines is information indicating a maximum communication capacity of data transmittable via the optical fiber lines. The map information, the branching information, and the maximum communication capacity information of the optical fiber lines may be input to the storage means 410 in advance.

The communication capacity information of the optical fiber lines is accumulation of traffic of communication carried out through the optical fiber lines obtained by the obtaining means 105. The obtaining means 105 may collect, via the main communication means 101, the traffic of communication carried out through the optical fiber lines, and may accumulate, in the storage means 410, the collected communication traffic as past communication capacity information of the optical fiber lines. The past communication traffic can be used as information used to estimate a necessary communication capacity.

The processing capacities of the free-space optical communication apparatuses may include, for example, information indicating processing capacities of CPUs of the free-space optical communication apparatus, total numbers of channels of the free-space optical communication apparatus, whether the free-space optical communication apparatuses can carry out wavelength multiplexing, maximum transmission capacities of the free-space optical communication apparatuses, and/or maximum communication rates of the free-space optical communication apparatuses. The processing capacities of the free-space optical communication apparatuses may be input to the storage means 410 in advance.

The communication statuses of the free-space optical communication apparatuses may include, for example, information indicating the current numbers of clear channels of the free-space optical communication apparatuses, the numbers of channels in use of the corresponding one of the free-space optical communication apparatuses, communication rates of the free-space optical communication apparatuses, communication qualities of the free-space optical communication apparatuses, the presence or absence of a failure in the free-space optical communication apparatuses, and/or communication capacities of the free-space optical communication apparatuses. The obtaining means 105 may collect, via the sub communication means 103, the communication statuses of the free-space optical communication apparatuses, and may accumulate the collected communication statuses in the storage means 410.

Similarly to the specifying means 102, the specifying section 402 specifies, from one or more targets 10, a free-space optical communication target on the basis of a communication status of the main communication means 101. In this process, in response to a phenomenon that a part of the optical fiber lines is interrupted, the specifying means 402 specifies that each target located downstream of the part is the free-space optical communication target. Examples of the phenomenon that the part of the optical fiber lines is interrupted include a state in which a part of the optical fiber lines is cut off, a state in which a failure occurs in a part of the nodes which relay the optical fiber lines or from which the optical fiber lines branch, and a state in which a part of the optical fiber lines or the nodes is a maintenance target. However, this is not limitative.

In accordance with the communication status of the main communication means 101, the specifying means 402 may determine in which part of the optical fiber lines the interruption occurs. Then, on the basis of the optical fiber line information stored in the storage means 410, the specifying means 402 may specify each target located downstream of the part of the optical fiber lines.

For example, in a case where the main communication means 101 obtains, as the statuses of communication with the edge terminals, the statuses shown in Table 1 below, the specifying means 402 may determine that a failure occurs in the optical fiber line $F_{1-2}$ or the node 12, and may specify, as the free-space optical communication targets, the edge terminals 14 and 15, each of which is a target located downstream of the optical fiber line $F_{1-2}$ or the node 12 and branches from the optical fiber line $F_{1-2}$ or the node 12.

TABLE 1

| | Edge terminal | | | |
|---|---|---|---|---|
| | 14 | 15 | 16 | 17 |
| Communication status | Did not reach node 12 | Did not reach node 12 | Good | Good |

Then, the selecting means 104 selects, for each of the free-space optical communication targets specified by the specifying means 402, a path for free-space optical communication of the sub communication means 103 with the free-space optical communication target, the selecting being carried out in accordance with at least one of (i) a capacity of communication of the main communication means 101 with the free-space optical communication target, (ii) the communication statuses of the free-space optical communication apparatuses, and (iii) the processing capacities of the free-space optical communication apparatuses obtained by the obtaining means 105.

In an example, in accordance with the traffic of communication of the main communication means 101 with the free-space optical communication target which traffic is caused to be stored in the storage means 410 by the obtaining means 105, the selecting means 104 may estimate a communication capacity necessary to carry out free-space optical communication with the free-space optical communication target. The selecting means 104 may estimate the necessary communication capacity in accordance with traffic of the latest communication of the main communication means 101 with the free-space optical communication target. Alternatively, the selecting means 104 may estimate the necessary communication capacity in accordance with traffic of communication carried out by the main communication means 101 with the free-space optical communication targets in the same time slot in the past. Meanwhile, in a case where the selecting means 104 does not use the traffic of the communication of the main communication means 101 with the free-space optical communication target which traffic is obtained by the obtaining means 105, the selecting means 104 may use a predetermined value as a communication capacity necessary to carry out free-space optical communication with the free-space optical communication target.

The selecting means 104 may estimate, in accordance with at least one of (i) communication statuses of the free-space optical communication apparatuses 31 to 34 and (ii) processing capacities of the free-space optical communication apparatuses 31 to 34 stored in the storage means 410, a communication capacity of data transmittable through free-space optical communication carried out with a path including the free-space optical communication apparatuses. For example, the selecting means 104 may estimate, in accordance with the communication statuses of the free-space optical communication apparatuses 31 to 34 and the processing capacities of the free-space optical communication apparatuses 31 to 34, a communication capacity of data transmittable through free-space optical communication carried out with the path including the free-space optical communication apparatuses.

Then, the selecting means 104 may select the path so that the path for free-space optical communication is constituted by a free-space optical communication apparatus(es) satisfying the necessary communication capacity for free-space optical communication with the free-space optical communication target. In a case where a plurality of paths satisfy the necessary communication capacity, the selecting means may select a path having a small number of hops. Note that "the number of hops" refers to the number of free-space optical communication apparatuses that data travels through.

In a case where the selecting means 104 does not use the communication statuses of the free-space optical communication apparatuses 31 to 34 or the processing capacities of the free-space optical communication apparatuses 31 to 34, the selecting means 104 may select the path for free-space optical communication so that priority is given to free-space optical communication with, among the free-space optical communication targets specified by the specifying means 402, a free-space optical communication target that requires a larger communication capacity for free-space optical communication. The expression that "priority is given to free-space optical communication with a certain free-space optical communication target" means that a path for free-space optical communication with the certain free-space optical communication target satisfies conditions such as those shown below:

the number of hops is small;

the number of overlaps with other paths for free-space optical communication is small; and the number of available channels is large.

The selecting means 104 may estimate a communication delay on the basis of the communication statuses of the free-space optical communication apparatuses 31 to 34 and the processing capacities of the free-space optical communication apparatuses 31 to 34. The selecting means 104 may select the path so that the estimated communication delay satisfies communication requirements. Note that the communication requirements may be retained by the storage means 410 or may be obtained by the selecting means 104 from an edge terminal which is the free-space optical communication target.

Next, the following description will discuss operation of the selecting means 104 by taking an example. For example, assume a case where the specifying means 402 specifies the edge terminal 15 as the free-space optical communication target. In such a case, the selecting means 104 may select a path for free-space optical communication with the edge terminal 15, for example, in the following manner.

First, the selecting means 104 obtains, from the storage means 410, communication capacity information (such as the one shown in Table 2 below) regarding communication of the main communication means 101 with each target, the communication capacity information being obtained by the obtaining means 105. Then, in accordance with an average value of communication traffic obtained in the same time slot in the past, the selecting means estimates that a communication capacity necessary to carry out free-space optical communication with the edge terminal 15, which is the free-space optical communication target, is 30.

TABLE 2

| | Edge terminal | | | |
|---|---|---|---|---|
| | 14 | 15 | 16 | 17 |
| Average value of communication traffic in the same time slot in the past | 20 | 30 | 20 | 10 |

Further, the selecting means 104 obtains, from the storage means 410, processing capacity information and communication status information of the free-space optical communication apparatuses, such as those shown in Table 3 below. Then, the selecting means 104 extracts the free-space optical communication apparatuses 31, 33, and 34 as free-space optical communication apparatuses satisfying "30", which is the communication capacity necessary to carry out the free-space optical communication with the edge terminal 15. The selecting means 104 then selects, as a path for free-space optical communication from the communication control system 400 to the edge terminal 15, a path passing through the free-space optical communication apparatuses 31, 33, and 34.

TABLE 3

| | Free-space optical communication apparatus | | | |
|---|---|---|---|---|
| | 31 | 32 | 33 | 34 |
| Processing capacity | 50 | 20 | 30 | 30 |
| Communication status | Clear | Clear | Clear | Clear |
| | CH = 2 | CH = 1 | CH = 3 | CH = 2 |

Then, the sub communication means 103 may transmit, to the free-space optical communication apparatuses included in the path selected by the selecting means 104, a connection instruction for constituting the path. The sub communication means 103 may transmit the connection instruction through free-space optical communication or through another communication means such as radio communication.

In a case where a phenomenon that a part of the optical fiber lines is interrupted occurs, the communication control system 400 can appropriately specify a target of backup through free-space optical communication and can carry out backup of the target.

The foregoing description has discussed the configuration in which the specifying means 402 specifies at least one of the edge terminals 14 to 17 as the free-space optical communication target. Alternatively, the specifying means 402 may specify at least one of the nodes 11 to 13 as the free-space optical communication target. In this case, each of the nodes 11 to 13 is preferably configured to be communicable with the free-space optical communication apparatus(es) and to have a function of converting, into an optical fiber signal, a communication signal transmitted/received to/from the free-space optical communication apparatus(es).

The foregoing description of the second example embodiment has discussed the communication control system 400. However, the communication control system 400 in accordance with the second example embodiment may be mounted in a single apparatus so as to be provided as a communication control apparatus. A communication control apparatus in accordance with the second example embodiment is configured such that the specifying section of the communication control apparatus in accordance with the first example embodiment further specifies, in response to a phenomenon that a part of the optical fiber lines is interrupted, that each target located downstream of the part is the free-space optical communication target.

Further, the communication control method in accordance with the second example embodiment is configured such that, in the communication control method in accordance with the first example embodiment, the specifying step of specifying the free-space optical communication target specifies, in response to a phenomenon that a part of the optical fiber lines is interrupted, that each target located downstream of the part is the free-space optical communication target.

Third Example Embodiment

A communication control system 500 in accordance with a third example embodiment differs from the communication control system 400 in accordance with the second example embodiment in that the communication control system 500 includes a specifying means 502 instead of the specifying means 402 and includes a selecting means 504 instead of the selecting means 104. Note that configurations identical to those of the first and second example embodiments are given identical reference signs, and a description thereof will be omitted.

Figure 5:
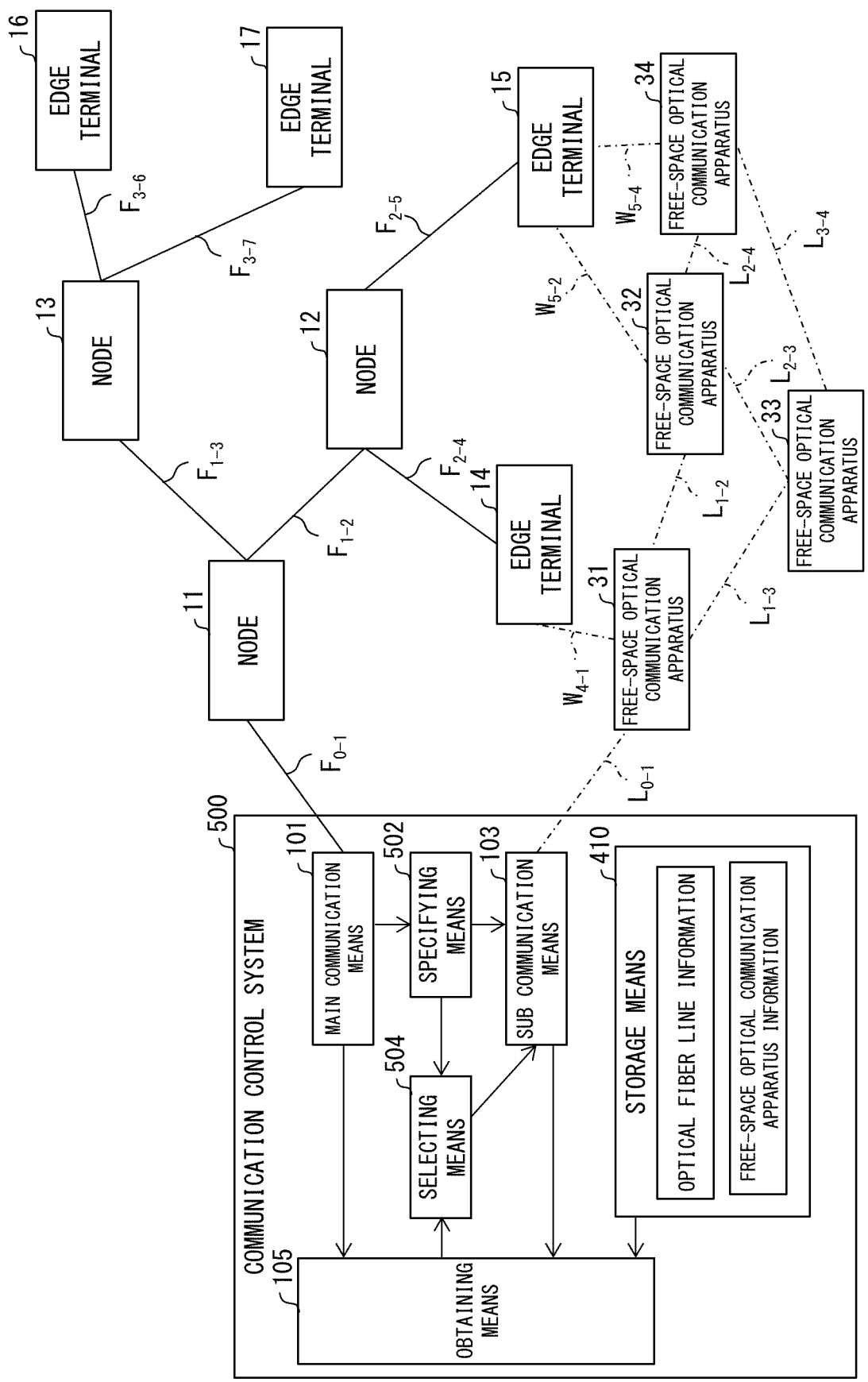
FIG. 5 is a block diagram illustrating an example of a configuration of a communication control system in accordance with a third example embodiment.

FIG. 5 is a block diagram illustrating an example of a configuration of the communication control system 500 in accordance with the third example embodiment of the present invention. As shown in FIG. 5, the communication control system 500 includes a main communication means 101, the specifying means 502, a sub communication means 103, the selecting means 504, and the storage means 410.

Similarly to the specifying means 102, the specifying section 502 specifies, from one or more targets 10, a free-space optical communication target on the basis of a communication status of the main communication means 101. In this process, in response to a phenomenon that a part of optical fiber lines is overloaded, the specifying means 502 specifies that at least one target located downstream of the part is the free-space optical communication target. Examples of the phenomenon that the part of the optical fiber lines is overloaded include communication capacity shortage caused by band shortage of the optical fiber lines and communication capacity shortage caused by processing capacity shortage of nodes which relays the optical fiber lines or from which the optical fiber lines branch. However, this is not limitative.

The specifying means 502 may determine, on the basis of the communication status of the main communication means 101, in which part of the optical fiber lines the overloading phenomenon occurs. Then, on the basis of optical fiber line information stored in the storage means 410, the specifying means 502 may specify at least one target located downstream of the part of the optical fiber lines.

For example, in a case where the obtaining means 105 obtains, as statuses of communication with the edge terminals, the statuses shown in Table 4 below, the specifying means 502 may determine that there is band shortage of the optical fiber line $F_{1-2}$ and may specify, as the free-space optical communication target, at least one of the edge terminals 14 and 15, each of which is a target located downstream of the optical fiber line $F_{1-2}$ and branches from the optical fiber line $F_{1-2}$. Note that Table 4 indicates states as the communication statuses. Alternatively, the obtaining means 105 may manage the communication statuses with use of (i) numerical values indicating the communication statuses and (ii) performances of the lines. The numerical value indicating the communication status may be, for example, a band use rate. The performance of the line may be, for example, a band width.

TABLE 4

| | Edge terminal | | | |
| --- | --- | --- | --- | --- |
| | 14 | 15 | 16 | 17 |
| Communication status | Good | Band shortage of optical fiber line $F_{1-2}$ | Good | Good |

Then, the selecting means 504 selects, for each of the free-space optical communication target(s) specified by the specifying means 502, a path for free-space optical communication of the sub communication means 103 with the free-space optical communication target, the selecting being carried out in accordance with at least one of (i) a capacity of communication of the main communication means 101 with the free-space optical communication target, (ii) the communication statuses of the free-space optical communication apparatuses, and (iii) the processing capacities of the free-space optical communication apparatuses obtained by the obtaining means 105.

In an example, the selecting means 504 may estimate, on the basis of traffic of communication of the main communication means 101 with the free-space optical communication target stored in the storage means 410, an amount of communication capacity shortage in optical fiber communication with the free-space optical communication target. The selecting means 504 may estimate the amount of the communication capacity shortage on the basis of traffic of the latest communication of the main communication means 101 with the free-space optical communication target. Alternatively, the selecting means 504 may estimate the amount of the communication capacity shortage on the basis of traffic of communication carried out by the main communication means 101 with the free-space optical communication target in the same time slot in the past. In a case where the selecting means 504 does not use the traffic of the communication of the main communication means 101 with the free-space optical communication target which traffic is stored in the storage means 410, the selecting means 504 may use an actual amount of communication capacity shortage as the amount of the communication capacity shortage in optical fiber communication with the free-space optical communication target. For example, the selecting means 504 may estimate the amount of the communication capacity shortage in optical fiber communication with the free-space optical communication target, for example, on the basis of the band use rate. The band use rate is an indicator calculated by using a maximum band as a denominator and an amount of data that is being actually transferred as a numerator.

The selecting means 504 may estimate, in accordance with at least one of (i) communication statuses of the free-space optical communication apparatuses 31 to 34 and (ii) processing capacities of the free-space optical communication apparatuses 31 to 34 stored in the storage means 410, a communication capacity of data transmittable through free-space optical communication carried out with a path including the free-space optical communication apparatuses. For example, the selecting means 504 may estimate, in accordance with the communication statuses of the free-space optical communication apparatuses 31 to 34 and the processing capacities of the free-space optical communication apparatuses 31 to 34, a communication capacity of data transmittable through free-space optical communication carried out with the path including the free-space optical communication apparatuses.

Then, the selecting means 504 may select the path so that the path for free-space optical communication is constituted by a free-space optical communication apparatus(es) supplementing the communication capacity shortage in the optical fiber communication with the free-space optical communication target. In a case where a plurality of paths satisfy the necessary communication capacity, the selecting means may select a path having a small number of hops (i.e., a small number of free-space optical communication apparatuses that data travels through).

In a case where the selecting means 504 does not use the communication statuses of the free-space optical communication apparatuses 31 to 34 or the processing capacities of the free-space optical communication apparatuses 31 to 34, the selecting means 504 may select the path for free-space optical communication so that priority is given to free-space optical communication with, from among the free-space optical communication targets specified by the specifying means 502, a free-space optical communication target having a large amount of communication capacity shortage in optical fiber communication. The expression that "priority is given to free-space optical communication with a certain free-space optical communication target" means that a path for free-space optical communication carried out with the certain free-space optical communication target satisfies conditions such as those shown below:
the number of hops is small;
the number of overlaps with other paths for free-space optical communication is small; and
the number of available channels is large.

The selecting means 504 may estimate a communication delay amount on the basis of the communication statuses of the free-space optical communication apparatuses 31 to 34 and the processing capacities of the free-space optical communication apparatuses 31 to 34. The selecting means 504 may select the path so that the estimated delay amount satisfies communication requirements. Note that the communication requirements may be retained by the storage means 410 or may be obtained by the selecting means 504 from an edge terminal which is the free-space optical communication target.

Next, the following description will discuss operation of the selecting means 504 by taking an example. For example, assume a case where the specifying means 402 specifies the edge terminal 15 as the free-space optical communication target. In such a case, the selecting means 504 may select a path for free-space optical communication with the edge terminal 15, for example, in the following manner.

First, the selecting means 504 obtains, from the storage means 410, (i) communication capacity information regarding communication of the main communication means 101 with each target obtained by the obtaining means 105, such as those shown in Table 2 above, and (ii) maximum communication capacity information of each optical fiber line, such as those shown in Table 5 below. Then, in accordance with an average value of communication traffic obtained in the same time slot in the past and the maximum communication capacity information of the optical fiber lines, the selecting means 504 estimates that an amount of communication capacity shortage in optical fiber communication carried out with the edge terminal 15, which is the free-space optical communication target, is 10.

TABLE 5

|  | Optocal fiber line | | | | | | |
| --- | --- | --- | --- | --- | --- | --- | --- |
|  | 0-1 | 1-2 | 1-3 | 2-4 | 2-5 | 3-6 | 3-7 |
| Max. communication capacity | 100 | 40 | 40 | 30 | 30 | 30 | 30 |

Further, the selecting means 504 obtains, from the storage means 410, processing capacity information and communication status information of the free-space optical communication apparatuses, such as those shown in Table 3 above. Then, the selecting means 504 extracts the free-space optical communication apparatuses 31, 32, 33, and 34 as free-space optical communication apparatuses satisfying "10", which is the amount of communication capacity shortage in the optical fiber communication with the edge terminal 15. The selecting means 504 then selects, as a shortest path for free-space optical communication from the communication control system 400 to the edge terminal 15, a path passing through the free-space optical communication apparatuses 31 and 32. Note that the shortest path refers to a path having a smallest number of hops.

In a case where a phenomenon that a part of the optical fiber lines is overloaded occurs, the communication control system 500 can eliminate the overload by carrying out, in addition to the communication via the optical fiber lines, communication through free-space optical communication.

The foregoing description has discussed the configuration in which the specifying means 502 specifies at least one of the edge terminals 14 to 17 as the free-space optical communication target. Alternatively, the specifying means 502 may specify at least one of the nodes 11 to 13 as the free-space optical communication target. In this case, each of the nodes 11 to 13 is preferably configured to be communicable with the free-space optical communication apparatus(es) and to have a function of converting, into an optical fiber signal, a communication signal transmitted/received to/from the free-space optical communication apparatus(es).

The foregoing description of the third example embodiment has discussed the communication control system 500. However, the communication control system 500 in accordance with the third example embodiment may be mounted in a single apparatus so as to be provided as a communication control apparatus. A communication control apparatus in accordance with the third example embodiment is configured such that the specifying section of the communication control apparatus in accordance with the first example embodiment further specifies, in response to a phenomenon that a part of the optical fiber lines is overloaded, that at least one target located downstream of the part is the free-space optical communication target.

Further, the communication control method in accordance with the third example embodiment is configured such that, in the communication control method in accordance with the first example embodiment, the specifying step of specifying the free-space optical communication target specifies, in response to a phenomenon that a part of the optical fiber lines is overloaded, that at least one target located downstream of the part is the free-space optical communication target.

Fourth Example Embodiment

A communication control system 600 in accordance with a fourth example embodiment differs from the communication control system 500 in accordance with the third example embodiment in that the communication control system 600 includes a selecting/adjusting means 604 instead of the selecting means 504. Note that configurations identical to those of the first to third example embodiments are given identical reference signs, and a description thereof will be omitted.

Figure 6:
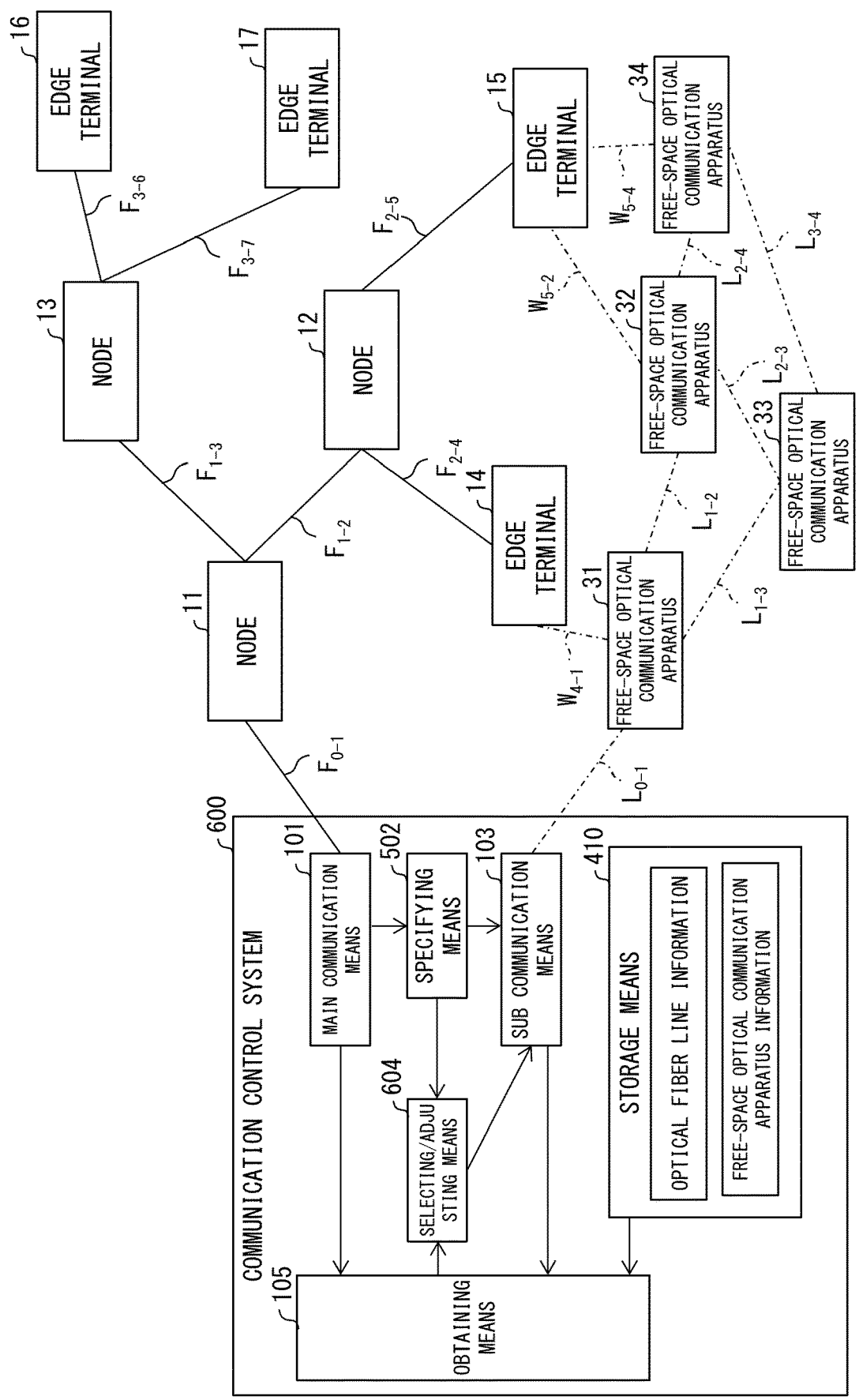
FIG. 6 is a block diagram illustrating an example of a configuration of a communication control system in accordance with a fourth example embodiment.

FIG. 6 is a block diagram illustrating an example of a configuration of the communication control system 600 in accordance with the fourth example embodiment of the present invention. As shown in FIG. 6, the communication control system 600 includes a main communication means 101, a specifying means 502, a sub communication means 103, the selecting/adjusting means 604, and a storage means 410.

Then, similarly to the selecting means 504, the selecting/adjusting means 604 selects, for each of free-space optical communication target(s) specified by the specifying means 502, a path for free-space optical communication of the sub communication means 103 with the free-space optical communication target, the specifying being carried out in accordance with at least one of (i) a capacity of communication of the main communication means 101 with the free-space optical communication target, (ii) communication statuses of free-space optical communication apparatuses, and (iii) processing capacities of the free-space optical communication apparatuses obtained by the obtaining means 105.

Further, the selecting/adjusting means 604 further adjusts traffic of the communication of the main communication means 101 with the free-space optical communication target and traffic of the communication of the sub communication means 103 with the free-space optical communication target, the adjusting being carried out in accordance with at least one of (i) the capacity of the communication of the main communication means 101 with the free-space optical communication target, (ii) the communication statuses of the free-space optical communication apparatuses, and (iii) the processing capacities of the free-space optical communication apparatuses.

The selecting/adjusting means 604 may adjust each of the traffic of the communication of the main communication means 101 with the free-space optical communication target and the traffic of the communication of the sub communication means 103 with the free-space optical communication target so as to equalize a load of the communication of the main communication means 101 with the free-space optical communication target and a load of the communication of the sub communication means 103 with the free-space optical communication target.

In an example, on the basis of the traffic of the communication of the main communication means 101 with the free-space optical communication target which traffic is stored in the storage means 410, the selecting/adjusting means 604 may estimate a communication capacity necessary to carry out communication with the free-space optical communication target. The selecting/adjusting means 604 may estimate the necessary communication capacity on the basis of traffic of the latest communication of the main communication means 101 with the free-space optical communication target. Alternatively, the selecting/adjusting means 604 may estimate the necessary communication capacity on the basis of traffic of communication carried out by the main communication means 101 with the free-space optical communication targets in the same time slot in the past. In a case where the selecting/adjusting means 604 does not use the traffic of the communication of the main communication means 101 with the free-space optical communication target which traffic is obtained by the obtaining means 105, the selecting/adjusting means 604 may use an actual amount of traffic as a communication capacity necessary to carry out communication with the free-space optical communication target.

The selecting/adjusting means 604 may estimate, in accordance with at least one of (i) communication statuses of the free-space optical communication apparatuses 31 to 34 and (ii) processing capacities of the free-space optical communication apparatuses 31 to 34, a communication capacity of data transmittable through free-space optical communication carried out with a path including the free-space optical communication apparatuses. In a case where the selecting/adjusting means 604 does not use the communication statuses of the free-space optical communication apparatuses 31 to 34 or the processing capacities of the free-space optical communication apparatuses 31 to 34, the selecting/adjusting means 604 may use a predetermined value as the communication capacity of data transmittable through free-space optical communication carried out with the path including the free-space optical communication apparatuses.

Then, in accordance with a maximum communication capacity of optical fiber communication and a maximum communication capacity of free-space optical communication, the selecting/adjusting means 604 allocates the communication capacity necessary to carry out communication with the free-space optical communication target to (i) communication to be carried out by the main communication means 101 and (ii) communication to be carried out by the sub communication means 103.

For example, in a case where the specifying means 502 specifies the edge terminal 15 as the free-space optical communication target and the selecting/adjusting means 604 selects, as a path for free-space optical communication designated to the edge terminal 15, a path passing through the free-space optical communication apparatuses 31 and 32, the selecting/adjusting means 604 may adjust, for example, the traffic of the communication of the main communication means 101 with the free-space optical communication target and the traffic of the communication of the sub communication means 103 with the free-space optical communication target in the following manner.

First, the selecting/adjusting means 604 obtains, from the storage means 410, (i) communication capacity information regarding communication of the main communication means 101 with each target obtained by the obtaining means 105, such as those shown in Table 2 above, and (ii) maximum communication capacity information of each optical fiber line, such as those shown in Table 5 below. Then, in accordance with an average value of communication traffic obtained in the same time slot in the past, the selecting/adjusting means 604 estimates that a communication capacity necessary to carry out communication with the edge terminal 15, which is the free-space optical communication target, is 30. Further, on the basis of the maximum communication capacity information of the optical fiber lines, the selecting/adjusting means 604 estimates that a maximum communication capacity of the optical fiber communication with the edge terminal 15 is 30.

Further, the selecting/adjusting means 604 obtains, from the storage means 410, processing capacity information and communication status information of the free-space optical communication apparatuses, such as those shown in Table 3 above. Then, on the basis of the processing capacity information and the communication status information of the free-space optical communication apparatuses, the selecting/adjusting means 604 estimates that a maximum communication capacity of the path passing through the free-space optical communication apparatuses 31 and 32 is 20.

Then, the selecting/adjusting means 604 assigns "30", which is the communication traffic necessary for communication with the edge terminal 15, such that "18" is given to the optical fiber communication and "12" is given to the free-space optical communication, in accordance with a ratio between "30", which is the maximum communication capacity of the optical fiber communication, and "20", which is the maximum communication capacity of the free-space optical communication. This can equalize the load of the optical fiber communication and the load of the free-space optical communication.

As discussed above, the communication control system 600 can equalize the load of the optical fiber communication and the load of the free-space optical communication, thereby preventing one of the optical fiber communication and the free-space optical communication from being overloaded.

The foregoing description of the fourth example embodiment has discussed the communication control system 600. However, the communication control system 600 in accordance with the fourth example embodiment may be mounted in a single apparatus so as to be provided as a communication control apparatus. A communication control apparatus in accordance with the fourth example embodiment is configured such that the communication control apparatus in accordance with the third example embodiment further includes: an adjusting section that adjusts traffic of communication of the main communication section with the free-space optical communication target and traffic of communication of the sub communication section with the free-space optical communication target, the adjusting being carried out in accordance with at least one of (i) a capacity of communication of the main communication section with the free-space optical communication target, (ii) communication statuses of the free-space optical communication apparatuses, and (iii) processing capacities of the free-space optical communication apparatuses, obtained by the obtaining section.

The communication control method in accordance with the fourth example embodiment is configured to further includes, in the communication control method in accordance with the third example embodiment, the step of adjusting traffic of communication of the main communication section with the free-space optical communication target and traffic of communication of the sub communication section with the free-space optical communication target, the adjusting being carried out in accordance with at least one of (i) a capacity of communication of the main communication section with the free-space optical communication target, (ii) communication statuses of the free-space optical communication apparatuses, and (iii) processing capacities of the free-space optical communication apparatuses, obtained by the obtaining section.

Fifth Example Embodiment

A communication control system 700 in accordance with a fifth example embodiment differs from the communication control system 400 in accordance with the second example embodiment in that the communication control system 700 includes a selecting means 704 instead of the selecting means 104. Note that configurations identical to those of the first and second example embodiments are given identical reference signs, and a description thereof will be omitted.

Figure 7:
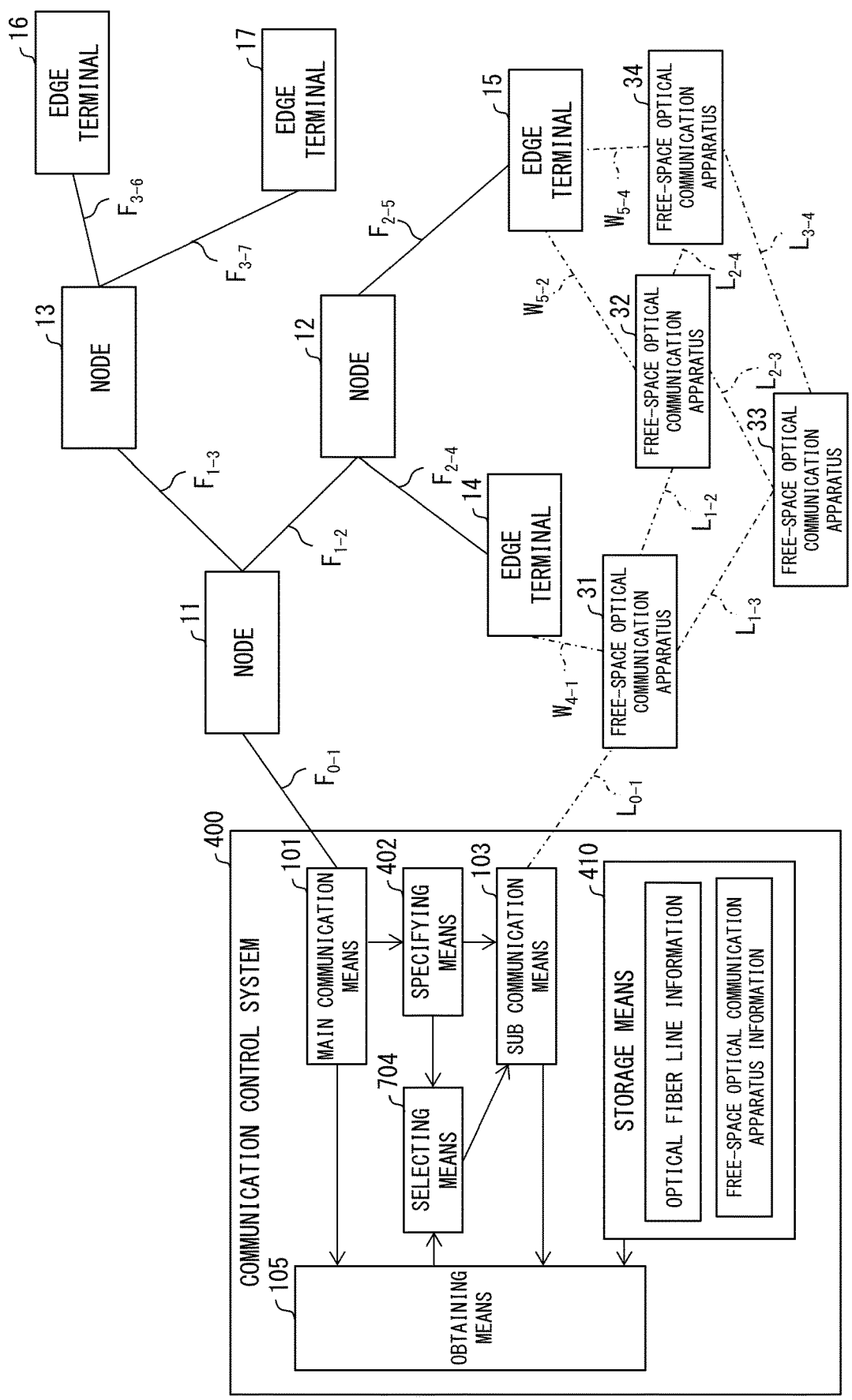
FIG. 7 is a block diagram illustrating an example of a configuration of a communication control system in accordance with a fifth example embodiment.

FIG. 7 is a block diagram illustrating an example of a configuration of the communication control system 700 in accordance with the fifth example embodiment of the present invention. As shown in FIG. 7, the communication control system 700 includes a main communication means 101, a specifying means 402, a sub communication means 103, the selecting means 704, and a storage means 410.

Similarly to the selecting means 104, the selecting means 704 selects, for each of free-space optical communication target(s) specified by the specifying means 102, a path for free-space optical communication of the sub communication means 103 with the free-space optical communication target, the specifying being carried out in accordance with at least one of (i) a capacity of communication of the main communication means 101 with the free-space optical communication target, (ii) communication statuses of the free-space optical communication apparatuses, and (iii) processing capacities of the free-space optical communication apparatuses obtained by the obtaining means 105.

Further, in accordance with a delay amount of free-space optical communication carried out through the selected path for free-space optical communication with the free-space optical communication target, the selecting means 704 selects again a path for free-space optical communication with the free-space optical communication target.

In some cases, an allowable delay amount is defined depending on the type of communication (for example, conversation). In a case where the delay amount of the communication through the path selected by the selecting means 704 is not less than the defined threshold, the selecting means 704 may select again a path for free-space optical communication with the free-space optical communication target. In such a case, the selecting means 704 may select again the path on the basis of the standard for selecting the one with a small number of hops, in preference to the standard used in the selection carried out before.

As discussed above, the communication control system 700 can select the path for free-space optical communication in such a manner as to prevent the delay amount from exceeding the allowable amount.

The foregoing description has discussed, as the fifth example embodiment, the configuration obtained by combining the first example embodiment with the operation for selecting the path again. Alternatively, the fifth example embodiment may be a combination of each of the second to fourth example embodiments with the operation for selecting the path again.

The foregoing description of the fifth example embodiment has discussed the communication control system 700. However, the communication control system 700 in accordance with the fifth example embodiment may be mounted in a single apparatus so as to be provided as a communication control apparatus. A communication control apparatus in accordance with the fifth example embodiment is configured such that, the selecting section of the communication control apparatus in accordance with the first example embodiment further selects again a path for free-space optical communication with the free-space optical communication target, the selecting being carried out in accordance with a delay amount of free-space optical communication carried out through the selected path for free-space optical communication with the free-space optical communication target.

The communication control method in accordance with the fifth example embodiment is configured such that, in the communication control method in accordance with the first example embodiment, a path for free-space optical communication with the free-space optical communication target is selected again in accordance with a delay amount of free-space optical communication carried out through the selected path for free-space optical communication with the free-space optical communication target.

The present disclosure is not limited to the example embodiments above, but can be altered by a skilled person in the art. The present disclosure also encompasses, in its technical scope, any embodiment derived by combining configurations, operation, and processes disclosed in differing embodiments as appropriate.

Figure 8:
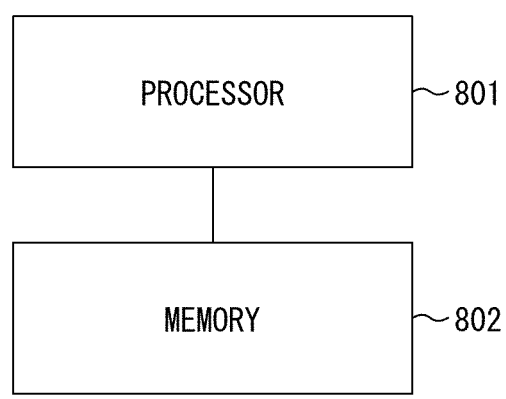
FIG. 8 is a view illustrating an outline of a hardware of a computer in accordance with each of the embodiments.

The configurations in accordance with the first to fifth example embodiments may be configured by a single piece of hardware. The configurations in accordance with the first to fifth example embodiments may be configured by a single piece of software. The configurations in accordance with the first to fifth example embodiments may be configured by a plurality of pieces of hardware. The configurations in accordance with the first to fifth example embodiments may be configured by a plurality of pieces of software. The configurations in accordance with the first to fifth example embodiments may be configured by a combination of hardware and software. The configurations in accordance with the first to fifth example embodiments may be implemented in a cloud. The apparatuses, functions, and processes may be realized by a computer including a processor 801 and a memory 802 such as those shown in FIG. 8. For example, a program for carrying out the communication control method discussed in any of the first to fifth example embodiments may be stored in the memory 802, and the program stored in the memory 802 may be read and executed by the processor 801, so that the configurations in accordance with the first to fifth example embodiments are realized.

The program read in the computer includes a group of instructions for causing the computer to execute one or more of the functions discussed in the first to fifth example embodiments. The program is stored in the memory 802. Examples of the processor 801 encompass a Central Processing Unit (CPU). Examples of the memory 802 encompass a Read Only Memory (ROM), a Random Access Memory (RAM), a flash memory, and a Solid State Drive (SSD).

The present disclosure is not limited to the foregoing example embodiments. That is, the present invention may employ various aspects that a person skilled in the art can understand within the scope of the present invention. Some or all of the above example embodiments can be described as below. Note, however, that the present invention is not limited to aspects described below.

Supplementary Note 1

A communication control system including:
a main communication means that carries out communication with one or more targets through an optical fiber line;
a specifying means that specifies, from among the one or more targets, a free-space optical communication target on a basis of communication statuses in the main communication means;
a sub communication means that carries out communication with the free-space optical communication target through at least one of free-space optical communication apparatuses;
an obtaining means that obtains at least one of (i) a capacity of communication of the main communication section with the free-space optical communication target get carried out in the past, (ii) communication statuses of the free-space optical communication apparatuses, and (iii) processing capacities of the free-space optical communication apparatuses; and
a selecting means that selects, in accordance with at least one of (i) the capacity of the communication, (ii) the communication statuses, and (iii) the processing capacities thus obtained, a path for free-space optical communication with the free-space optical communication target which is to be carried out by the sub communication means.

Supplementary Note 2

The communication control system described in Supplementary Note 1, wherein: in response to a phenomenon that a part of the optical fiber line is interrupted, the specifying means specifies that each target located downstream of the part is the free-space optical communication target.

Supplementary Note 3

The communication control system described in Supplementary Note 1, wherein: in response to a phenomenon that a part of the optical fiber line is overloaded, the specifying means specifies that at least one target located downstream of the part is the free-space optical communication target.

Supplementary Note 4

The communication control system described in Supplementary Note 3, further including an adjusting means that adjusts traffic of the communication of the main communication means with the free-space optical communication target and traffic of the communication of the sub communication means with the free-space optical communication target, the adjusting being carried out in accordance with at least one of (i) the capacity of the communication, (ii) the communication statuses, and (iii) the processing capacities thus obtained.

Supplementary Note 5

The communication control system described in any one of Supplementary Notes 1 to 4, wherein: in accordance with a delay amount of free-space optical communication carried out through the selected path for free-space optical communication with the free-space optical communication target, the selecting means selects again a path for free-space optical communication with the free-space optical communication target.

Supplementary Note 6

A communication control apparatus including:
a main communication section that carries out communication with one or more targets through an optical fiber line;
a specifying section that specifies, from among the one or more targets, a free-space optical communication target on a basis of communication statuses in the main communication means;
a sub communication section that carries out communication with the free-space optical communication target through at least one of free-space optical communication apparatuses;

an obtaining section that obtains at least one of (i) a capacity of the past communication of the main communication section with the free-space optical communication target, (ii) communication statuses of the free-space optical communication apparatuses, and (iii) processing capacities of the free-space optical communication apparatuses; and a selecting section that selects, in accordance with at least one of (i) the capacity of the communication, (ii) the communication statuses, and (iii) the processing capacities thus obtained, a path for free-space optical communication with the free-space optical communication target carried out by the sub communication section.

Supplementary Note 7

The communication control system described in Supplementary Note 6, wherein: in response to a phenomenon that a part of the optical fiber line is interrupted, the specifying section specifies that each target located downstream of the part is the free-space optical communication target.

Supplementary Note 8

The communication control apparatus described in Supplementary Note 6, wherein: in response to a phenomenon that a part of the optical fiber line is overloaded, the specifying section specifies that at least one target located downstream of the part is the free-space optical communication target.

Supplementary Note 9

The communication control apparatus described in Supplementary Note 8, further including an adjusting section that adjusts traffic of the communication of the main communication section with the free-space optical communication target and traffic of the communication of the sub communication section with the free-space optical communication target, the adjusting being carried out in accordance with at least one of (i) the capacity of the communication, (ii) the communication statuses, and (iii) the processing capacities thus obtained.

Supplementary Note 10

The communication control apparatus described in any one of Supplementary Notes 6 to 9, wherein: in accordance with a delay amount of free-space optical communication carried out through the selected path for free-space optical communication with the free-space optical communication target, the selecting section selects again a path for free-space optical communication with the free-space optical communication target.

Supplementary Note 11

A communication control method including:
(a) carrying out communication with one or more targets through an optical fiber line;
(b) specifying, from among the one or more targets, a free-space optical communication target on a basis of communication statuses in (a);
(c) carrying out communication with the free-space optical communication target through at least one of free-space optical communication apparatuses;
(d) obtaining at least one of (i) a capacity of the past communication with the free-space optical communication target in (a), (ii) communication statuses of the free-space optical communication apparatuses, and (iii) processing capacities of the free-space optical communication apparatuses; and
(e) selecting, in accordance with at least one of (i) the capacity of the communication, (ii) the communication statuses, and (iii) the processing capacities thus obtained, a path for free-space optical communication with the free-space optical communication target in (c).

Supplementary Note 12

The communication control method described in Supplementary Note 11, wherein: in (b), in response to a phenomenon that a part of the optical fiber line is interrupted, each target located downstream of the part is specified as the free-space optical communication target.

Supplementary Note 13

The communication control method described in Supplementary Note 11, wherein: in (b), in response to a phenomenon that a part of the optical fiber line is overloaded, at least one target located downstream of the part is specified as the free-space optical communication target.

Supplementary Note 14

The communication control method described in Supplementary Note 13, further comprising: (f) adjusting traffic of the communication with the free-space optical communication target in (a) and traffic of the communication with the free-space optical communication target in (c), the adjusting being carried out in accordance with at least one of (i) the capacity of the communication, (ii) the communication statuses, and (iii) the processing capacities thus obtained.

Supplementary Note 15

The communication control method described in any one of Supplementary Notes 11 to 14, wherein: in (e), a path for free-space optical communication with the free-space optical communication target is selected again in accordance with a delay amount of free-space optical communication carried out through the selected path for free-space optical communication with the free-space optical communication target.

REFERENCE SIGNS LIST

10: target
11 to 13: node
14 to 17: edge terminal
31 to 34: free-space optical communication apparatus
100, 400, 500, 600, 700: communication control system
101: main communication means
102, 402, 502: specifying means
103: sub communication means
104, 504, 704: selecting means
300: communication control apparatus
301: main communication means
302: specifying means
303: sub communication means
304: selecting means
410: storage means 604: selecting/adjusting means
801: processor
802: memory
F: optical fiber line
L: optical path
W: near-field radio communication

The invention claimed is:

1. A communication control system comprising at least one processor,
the at least one processor executing:
a main communication process of carrying out communication with one or more targets through an optical fiber line;
a specifying process of specifying, from among the one or more targets, a free-space optical communication target on a basis of communication statuses in the main communication process;
a sub communication process of carrying out communication with the free-space optical communication target through at least one of free-space optical communication apparatuses;
an obtaining process of obtaining at least one of (i) a capacity of the communication with the free-space optical communication target in the main communication process, (ii) communication statuses of the free-space optical communication apparatuses, and (iii) processing capacities of the free-space optical communication apparatuses; and
a selecting process of selecting, in accordance with at least one of (i) the capacity of the communication, (ii) the communication statuses, and (iii) the processing capacities thus obtained, a path for free-space optical communication with the free-space optical communication target which is to be carried out in the sub communication process.

2. The communication control system according to claim 1, wherein:
in the specifying process, the at least one processor specifies, in response to a phenomenon that a part of the optical fiber line is interrupted, that each target located downstream of the part is the free-space optical communication target.

3. The communication control system according to claim 1, wherein:
in the specifying process, the at least one processor specifies, in response to a phenomenon that a part of the optical fiber line is overloaded, that at least one target located downstream of the part is the free-space optical communication target.

4. The communication control system according to claim 3, wherein:
the at least one processor further executes:
an adjusting process of adjusting traffic of the communication with the free-space optical communication target in the main communication process and traffic of the communication with the free-space optical communication target in the sub communication process, the adjusting being carried out in accordance with at least one of (i) the capacity of the communication, (ii) the communication statuses, and (iii) the processing capacities thus obtained.

5. The communication control system according to claim 1, wherein:
in the selecting process, the at least one processor selects again a path for free-space optical communication with the free-space optical communication target, in accordance with a delay amount of free-space optical communication carried out through the selected path for free-space optical communication with the free-space optical communication target.

6. A communication control apparatus comprising at least one processor,
the at least one processor executing:
a main communication process of carrying out communication with one or more targets through an optical fiber line;
a specifying process of specifying, from among the one or more targets, a free-space optical communication target on a basis of communication statuses in the main communication process;
a sub communication process of carrying out communication with the free-space optical communication target through at least one of free-space optical communication apparatuses;
an obtaining process of obtaining at least one of (i) a capacity of the communication with the free-space optical communication target in the main communication process, (ii) communication statuses of the free-space optical communication apparatuses, and (iii) processing capacities of the free-space optical communication apparatuses; and
a selecting process of selecting, in accordance with at least one of (i) the capacity of the communication, (ii) the communication statuses, and (iii) the processing capacities thus obtained, a path for free-space optical communication with the free-space optical communication target which is to be carried out in the sub communication process.

7. The communication control apparatus according to claim 6, wherein:
in the specifying process, the at least one processor specifies, in response to a phenomenon that a part of the optical fiber line is interrupted, that each target located downstream of the part is the free-space optical communication target.

8. The communication control apparatus according to claim 6, wherein:
in the specifying process, the at least one processor specifies, in response to a phenomenon that a part of the optical fiber line is overloaded, that at least one target located downstream of the part is the free-space optical communication target.

9. The communication control apparatus according to claim 8, wherein:
the at least one processor further executes:
an adjusting process of adjusting traffic of the communication with the free-space optical communication target in the main communication process and traffic of the communication with the free-space optical communication target in the sub communication process, the adjusting being carried out in accordance with at least one of (i) the capacity of the communication, (ii) the communication statuses, and (iii) the processing capacities thus obtained.

10. The communication control apparatus according to claim 6, wherein:
in the selecting process, the at least one processor selects again a path for free-space optical communication with the free-space optical communication target, in accordance with a delay amount of free-space optical communication carried out through the selected path for free-space optical communication with the free-space optical communication target.

11. A communication control method comprising:
(a) carrying out communication with one or more targets through an optical fiber line;
(b) specifying, from among the one or more targets, a free-space optical communication target on a basis of communication statuses in (a);
(c) carrying out communication with the free-space optical communication target through at least one of free-space optical communication apparatuses;
(d) obtaining at least one of (i) a capacity of the communication with the free-space optical communication target in (a), (ii) communication statuses of the free-space optical communication apparatuses, and (iii) processing capacities of the free-space optical communication apparatuses; and
(e) selecting, in accordance with at least one of (i) the capacity of the communication, (ii) the communication statuses, and (iii) the processing capacities thus obtained, a path for free-space optical communication with the free-space optical communication target which is to be carried out in (c).

12. The communication control method according to claim 11, wherein:
in (b), in response to a phenomenon that a part of the optical fiber line is interrupted, each target located downstream of the part is specified as the free-space optical communication target.

13. The communication control method according to claim 11, wherein:
in (b), in response to a phenomenon that a part of the optical fiber line is overloaded, at least one target located downstream of the part is specified as the free-space optical communication target.

14. The communication control method according to claim 13, further comprising:
(f) adjusting traffic of the communication with the free-space optical communication target in (a) and traffic of the communication with the free-space optical communication target in (c), the adjusting being carried out in accordance with at least one of (i) the capacity of the communication, (ii) the communication statuses, and (iii) the processing capacities thus obtained.

15. The communication control method according to claim 11, wherein:
in (e), a path for free-space optical communication with the free-space optical communication target is selected again in accordance with a delay amount of free-space optical communication carried out through the selected path for free-space optical communication with the free-space optical communication target.

* * * * *